July 12, 1949.                    S. RONNING                        2,475,989
                              HEATER FOR AUTO ENGINES
                              Filed April 24, 1947

INVENTOR
SVERRE RONNING
BY
William F. Nickel
ATTORNEY

Patented July 12, 1949

2,475,989

UNITED STATES PATENT OFFICE 2,475,989

HEATER FOR AUTO ENGINES

Sverre Ronning, Brooklyn, N. Y.

Application April 24, 1947, Serial No. 743,555

4 Claims. (Cl. 219—38)

This invention is an improvement in heaters and especially a heater comprising a suitable casing with a heating element therein and means for attaching the heater, in direct contact with the object to be treated.

An important object of the invention is to provide a heater of the electric type for the engine of a motor vehicle, having means for securing it to the exterior of said engine in position to warm the oil therein, and a suitable connection for supplying it with current from the circuit of the garage where the vehicle is housed.

The invention is quite useful in the wintry season of the year when the oil in the engine of a motor car or truck becomes thick and heavy if the vehicle is exposed to a low temperature, and thus starting becomes difficult and imposes a heavy load on the already weakened storage battery of the vehicle. Thus if a car stands motionless overnight in a cold garage the owner may find himself unable to set the engine revolving when he wishes to run the car the next day. By my improvement this inconvenience is nullified, because in the garage the circuit connection can be instantly plugged into an ordinary electrical outlet to operate the heater and prevent the overcooling of the car during the night; the heater being secured permanently to the engine by means of clamps, so that it does not have to be dismounted at any time. The owner can at once get the engine into rotation; then he merely pulls out the plug of the connecting cord from the supply socket, coils up the cord and stows it in any suitable manner in any convenient place such as under the hood of the engine; and the car is ready to move out under its own power.

A further object of the invention is to provide a simple design of electric heater that is inexpensive to produce, easy to mount, and efficient and cheap in operation.

The invention is disclosed in the accompanying drawings and described in the following specification. The construction shown, however, is only one embodiment of the improvement; and alterations may be adopted without exceeding the broad and general meanings of the terms in which the appended claims are expressed.

Figure 1:
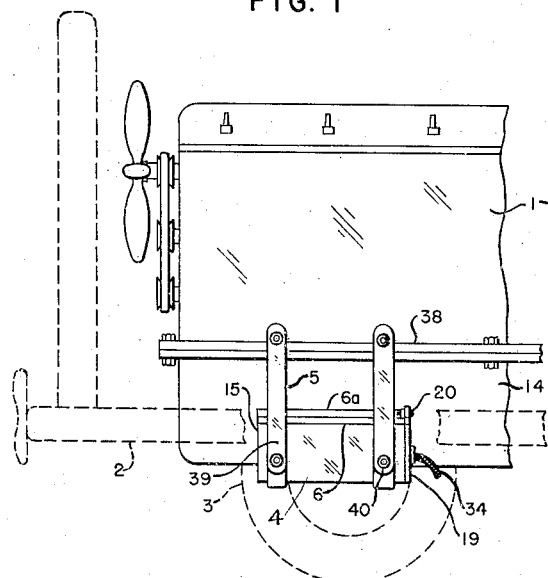
Figure 1 is a side view of a motor car having its engine equipped with a heater according to this invention.
Figure 2:
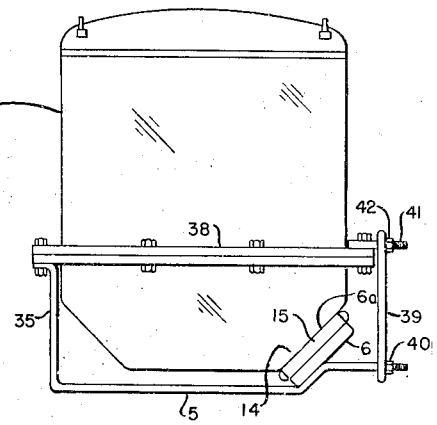
Figure 2 is a front view thereof.
Figure 3:
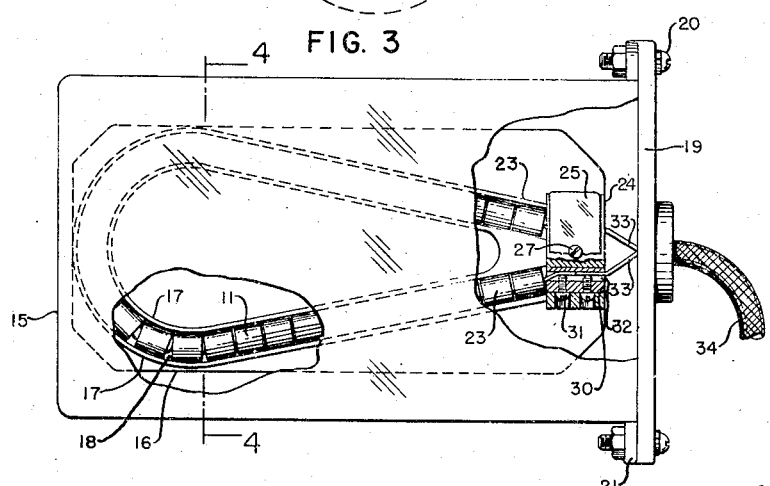
Figure 3 is a top plan of the heater casing with the top broken away to illustrate the heater member therein.
Figure 5:
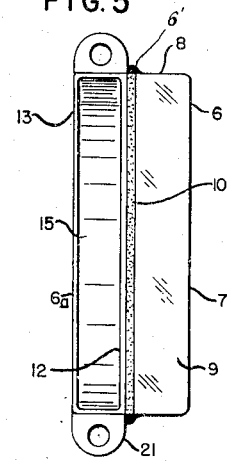
Figure 5 is an end view of the heater unit with the closure removed.
Figure 4:
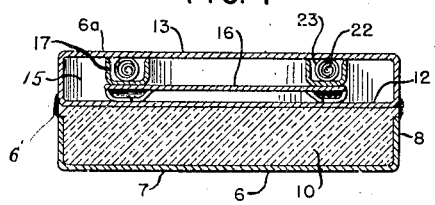
Figure 4 is a cross section on line 4—4 of Figure 3.
Figure 6:
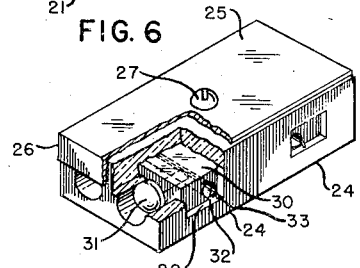

Figure 6 presents a detail.

The engine of the motor vehicle is shown at 1, mounted on the framework or chassis, part of which is indicated at 2, adjacent the front wheel 3. The heater is enclosed in a casing 4, and is secured against the exterior of the engine by suitable retaining members or metal straps 5. The casing can be attached to either the side or the bottom of the crank case at the lower part of the engine, this case ordinarily containing most of the oil which lubricates the engine in operation. When the car stands idle the oil collects in the crank case; and in cold weather, loses a great part of its fluidity, interfering greatly with starting. The heater of my invention keeps the crankcase and in some degree the entire engine warm, so that the oil remains thin and easily agitated and distributed to all necessary parts of the engine when the starting motor is set into rotation.

The casing 4 comprises two sections 6 and 6a, each of large extent in comparison to the depth or thickness thereof; each containing a separate compartment; the former comprising top 7, sides 8, and ends 9, preferably of metal sheeting, and is filled with heat insulating material 10. The face opposite the closed top 7 is open and the edges of the top sides and ends adjacent this face are soldered or welded as at 6' to the section 6a.

The section 6 overlies the section 6a, which houses the heating member 11. The section 6a and member 11 thus lie between the heat-in-insulating section 6 and the engine, and all the heat generated in the member 11 can be radiated in one direction only, and that is into the engine 1.

The section 6a is similar in shape to the section 6 and comprises a top 12, a bottom 13, laid against the engine side 14, and a closed end 15, the other end being open. The heating member 11 is carried by a removable plate 16 lying on the top part or partition 12. Upon this plate, affixed along its lower face is a channel-shaped member 17, forming a long loop-shaped or horseshoe-shaped chamber 18 which contains the heating member 11. This chamber or channel has both its extremities flush with one another at the end of the plate 16 which is to lie in the open end of the section 6a; said end being fitted with a closure 19, the ends of which have holes to receive fastening devices 20 by which the closure is affixed, when in place, to perforated lugs 21 on the section 6a. The heating member is a length of coiled wire 22, passed through a number of tubular elements 23, of insulating material, and constituting an enclosing sleeve. The extremities are affixed to terminals in two insulating blocks 24 at the ends of the chamber 18.

The blocks 24 are held in position against the surface of the plate 16 by a clamp 25, with downturned ends 26, and a screw 27 which passes through the clamp 25 between the blocks 24 and through a hole in the plate 16 to receive a nut (not shown) on the opposite face, which may have a depression or countersunk seat for a nut. The blocks 24 have bores 29 in which are terminals 30. A binding screw 31 passes through an opening in one side of each block 24, into a threaded opening in each terminal 30. The latter also have longitudinal bores 32 to receive the ends of the heater member and the screws 31 pass into the bores 32, making fast both the ends of the heater member and the terminals 30 in the blocks 24. The outer extremities of the bores 32 receive the ends of conductors 33, which are secured by additional screws 31; the conductors 33 being covered with insulation 34, being attached to an ordinary conductor plug, not shown, which fits into an outlet connector of the lighting circuit. Thus the heater is readily supplied with electric current.

The retaining members or metal clamps 5 (two in number) comprise three parts, one of which 35 has an outturned end with an opening to enable it to be engaged by one of the screws or bolts which go through the flanges 38 at the junction of the crank case and the body of the engine. This part extends down one side of the engine and across the bottom to the other side where it has a threaded end entering a hole in another part 39 of the clamp. A nut 40 holds the parts 35 and 39 together. At the upper end the part or link 39 has an opening for the threaded end of the remaining part 41, which is likewise affixed to the flanges 38, and to the link 39 by a nut 42. By these clamps the heater casing is securely held against the engine with the section 6 outermost.

The invention is therefore inexpensive and practical and well calculated to keep an engine warm and in condition for quick starting through the coldest nights of winter.

Having described my invention what I believe to be new is:

1. A heater comprising a relatively flat casing of large area in relation to the depth, a heating member in said casing, partitions enclosing said member and defining a bent channel therefor, an insulator block adjacent each end of said channel, terminals in said blocks, means carried by said terminals to secure the ends of the heating member and supply conductors thereto, and a clamp affixed in said casing to hold said blocks in place.

2. A heater comprising a relatively flat casing of large area in relation to the depth, a heating member in said casing, partitions enclosing said member and defining a horseshoe-shaped channel therefor, an insulator block adjacent each end of said channel, terminals in said blocks, means carried by said terminals to secure the ends of the heating member and supply conductors thereto, and a clamp affixed in said casing to hold said blocks in place; the casing having a perforated movable closure through which the conductors pass, adjacent said clamp.

3. A heater comprising a relatively flat casing of large area in relation to the depth, a heating member in said casing, partitions enclosing said member and defining a bent channel therefor, an insulator block adjacent each end of said channel, terminals in said blocks, means carried by said terminals to secure the ends of the heating member and supply conductors thereto and a clamp affixed in said casing to hold said blocks in place; the casing having a transverse partition dividing same into chambers, each of substantially the same area as aforesaid, a supporting plate for the first-named partitions on one side of said transverse partition and heat insulating material in the chamber on the opposite side thereof.

4. A heater comprising a relatively flat casing of large area in relation to the depth, a heating member in said casing, partitions enclosing said member and defining a horseshoe-shaped channel therefor, an insulator block adjacent each end of said channel, terminals in said blocks, means carried by said terminals to secure the ends of the heating member and supply conductors thereto, and a clamp affixed in said casing to hold said blocks in place; the casing having a perforated movable closure through which the conductors pass, adjacent said clamp, the casing having a transverse partition dividing same into chambers, each of substantially the same area as aforesaid, a supporting plate for the first-named partitions on one side of said transverse partition and heat insulating material in the chamber on the opposite side thereof.

SVERRE RONNING.

REFERENCES CITED

The following references are of record in the file of this patent:

UNITED STATES PATENTS

| Number | Name | Date |
|---|---|---|
| 1,552,336 | Mottlau | Sept. 1, 1925 |
| 1,764,021 | Jackson | June 17, 1930 |
| 1,781,412 | Slichter | Nov. 11, 1930 |
| 1,794,891 | Gerhardt | Mar. 3, 1931 |
| 2,160,227 | Platt | May 30, 1939 |